May 31, 1960 P. H. DIXON 2,938,431
LATCH MECHANISM FOR A 3.5" ROCKET LAUNCHER
Filed Oct. 24, 1958 3 Sheets-Sheet 1
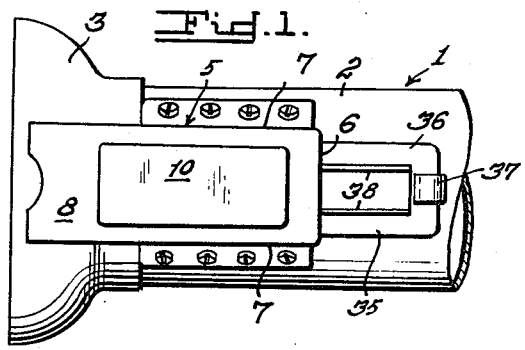
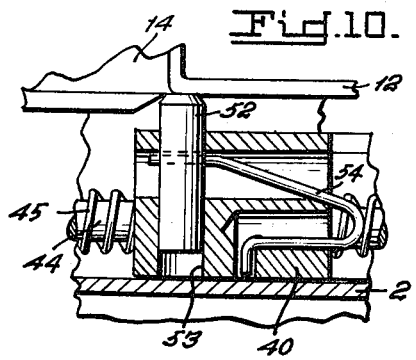
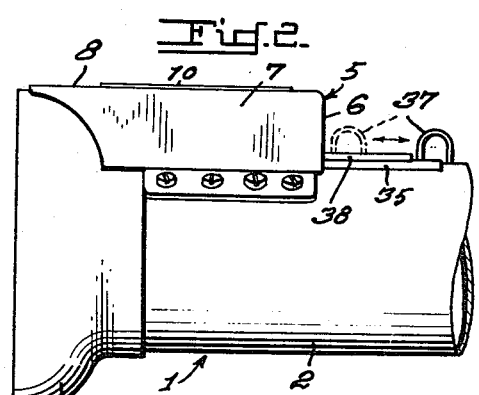
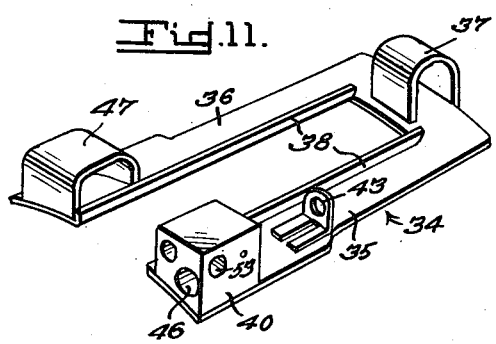
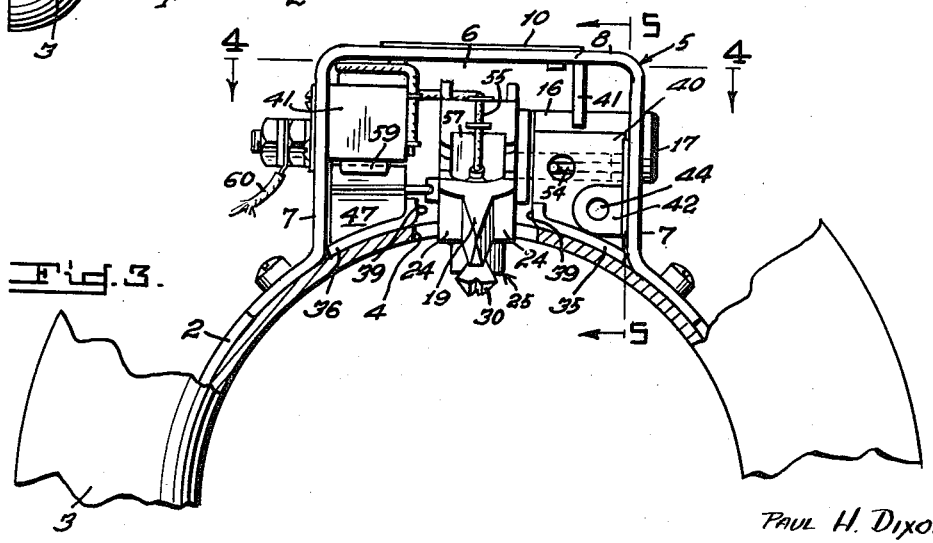
PAUL H. DIXON,
INVENTOR.
BY
W. E. Thibodeau & A. J. Dupont

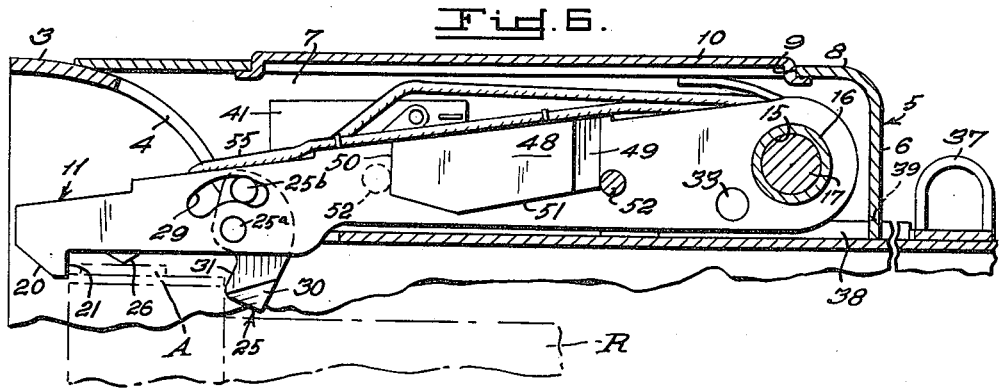
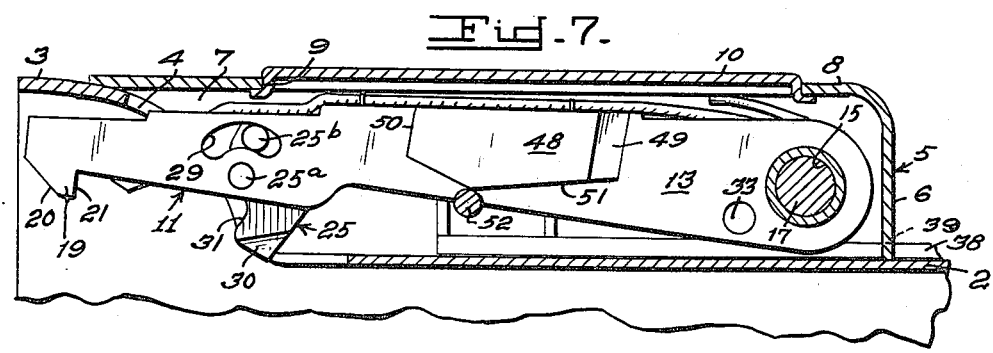
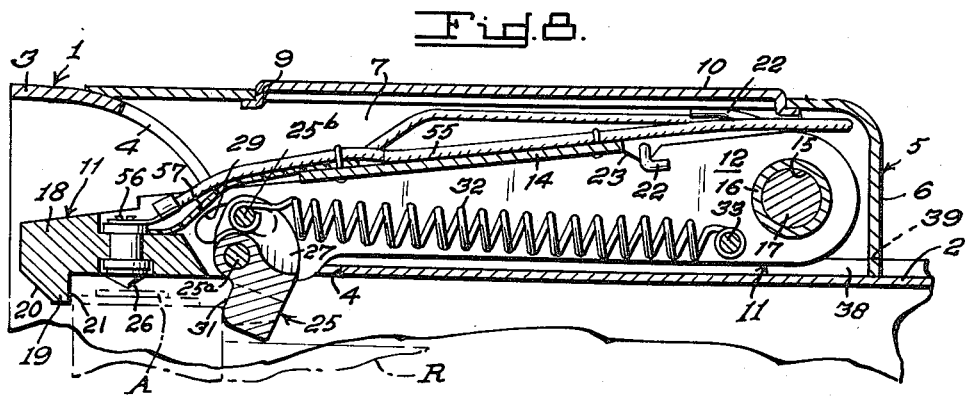
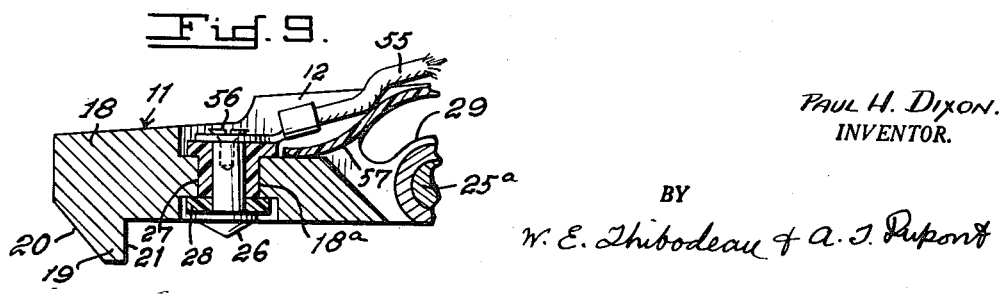

United States Patent Office 2,938,431
Patented May 31, 1960

2,938,431

LATCH MECHANISM FOR A 3.5″ ROCKET LAUNCHER

Paul H. Dixon, Rockford, Ill., assignor to the United States of America as represented by the Secretary of the Army Filed Oct. 24, 1958, Ser. No. 769,522

4 Claims. (Cl. 89—1.7)

This invention relates to a latch mechanism for a 3.5 rocket launcher and more particularly to a contact latch mechanism serving to position and hold a rocket in its firing position in a rocket launching tube and to make automatic electrical contact with the electrical firing source.

It is a primary object of this invention to provide a latch mechanism to position a rocket in a launching tube for firing therein.

It is another object to provide an automatic electric firing means disposed between the rocket contact band and the firing circuit.

It is another object of the invention to provide a latch mechanism for a rocket launcher that will automatically raise the latch and stop levers out of the path of a rocket blast to prevent their deterioration or injury therefrom.

It is a still further object of the invention to provide a latch mechanism for a rocket launcher that is fully automatic in operation to permit rapid launching of rockets therefrom and to permit a quick removal of misfires from the launcher.

The specific nature of the invention as well as other objects and advantages thereof, will clearly appear from a description of a preferred embodiment as shown in the accompanying drawings in which:

Fig. 1 is a top plan view of a latch mechanism constructed in accordance with the invention and affixed to the breech end of a rocket launching tube;

Fig. 2 is a side elevation of the latch mechanism;

Fig. 3 is a frontal view to an enlarged scale of the latch mechanism, the breech guard being broken away to reveal the mechanism;

Fig. 6 is sectional view taken along the line 6—6 of Fig. 4 and looking in the direction of the arrows, a rocket tail being shown in its firing position within the launching tube, Fig. 7 is a similar view to Fig. 6, but showing the slide being released and the latch and stop levers being in raised position out of the path of the rocket blast;

Fig. 8 is a sectional view taken along the line 8—8 of Fig. 4 and looking in the direction of the arrows;

Fig. 9 is an enlarged detail cross sectional view of the contact button;

Fig. 10 is an enlarged horizontal sectional view of the cam and plunger; and,

Fig. 11 is a perspective view of the loader's safety slide.

Figure 4:
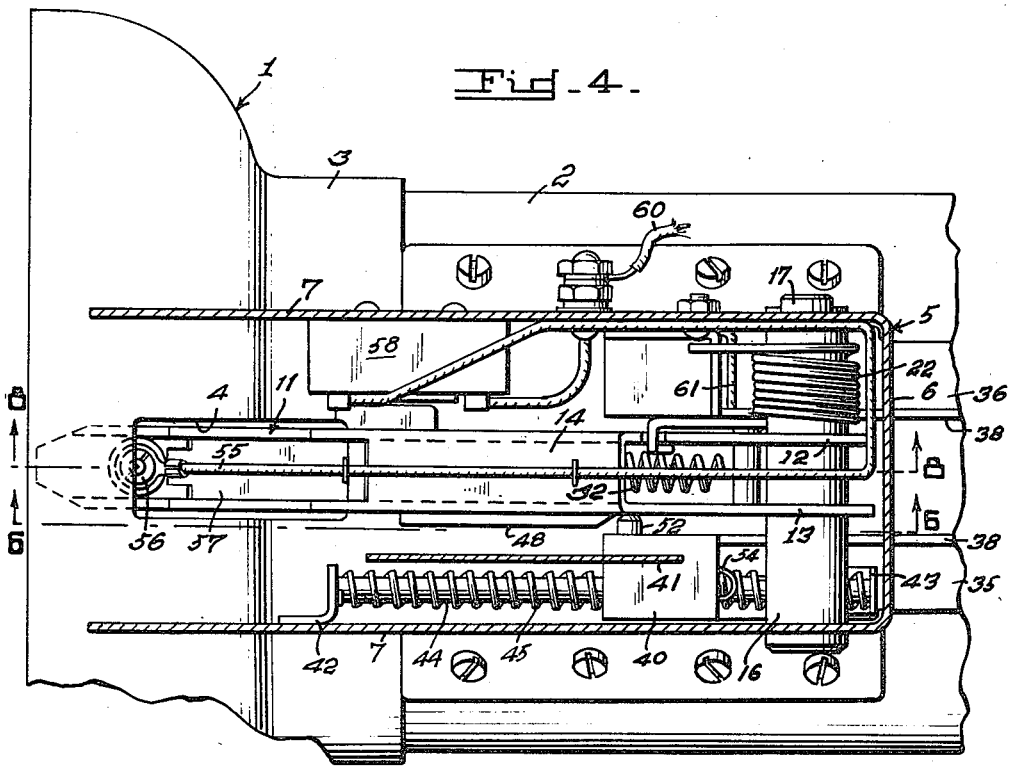
Fig. 4 is a sectional view taken along the line 4—4 of Fig. 3, looking in the direction of the arrows and illustrating the latch mechanism in plan.

Referring more particularly to the drawings in which like reference characters designate like parts throughout the several views reference character 1 indicates generally the breech end of a rocket launcher and includes a tube 2 and a breech guard 3. An opening 4 is provided in the breech guard to permit the entrance of rocket indexing members, to be described.

Affixed to the rearward portion of the breech end of the launcher is a housing indicated generally by 5 and includes a front wall 6, side walls 7 and a top wall 8. The top wall 8 is provided with an opening 9 for access into the housing and is covered by a lid 10.

The operating elements of the latch mechanism are mounted within the housing 5 and include an elongated latch lever indicated generally by 11. Lever 11 is constructed of a pair of side members 12 and 13 joined medially along their top edges by an integral web portion 14. (See Fig. 4.) Side members 12 and 13 are bored as at 15 at their forward ends thereof to receive a bushing 16. When assembled, this bushing receives a pin 17 trunnioned in side walls 7 of housing 5 transversely of the longitudinal axis of the launcher, providing a pivot for the lever 11. The rearward ends of side members 12 and 13 are attached by suitable means such as welding, to a block 18 defining a latch portion 19. The latch 19 defines a beveled rearward surface 20 and a vertical forward surface 21 for a purpose to be later described. A coil torsion spring 22 is disposed around pin 17 between side member 12 and a side wall 7 of housing 5. One end of spring 22 is received in a notch 23 in side wall 12, while the other end bears against top wall 8 of housing 5, normally biasing lever 11 downward and through opening 4 so that latch 19 may engage a rocket contact band A of a rocket R when in tube 1. (See Fig. 6.) The latch portion 19 is further beveled as at 24 (see Fig. 3) to prevent a rocket fin from bearing against the lever 11 and preventing its entrance into the launching tube. Block 18 is bored as at 18ª to receive a contact button 26. Contact button 26 is insulated from block 18 by a bushing 27 and a washer 28 both of a dielectric material. A rocket stop lever, indicated generally by 25, is pivotally mounted between side members 12 and 13 by pivot pin 25ª and is disposed forwardly of latch 19 (see Fig. 8). The upper portion of stop lever 25 is milled out as at 27 forming a pair of upstanding ears. A pin 25ᵇ transversely pierces these ears and extends into a pair of arcuate slots 29 formed in side members 12 and 13 of lever 11, limiting the rotation of stop lever 25. The lower portion of stop lever 25 is beveled as at 30 to prevent engagement of a rocket fin and preventing indexing of the rocket. A vertical rearward face 31 of 25 is provided to engage the contact ring A of a rocket R. (See Fig. 6). A coil spring 32 attached at one end to pin 28 and at its other end to a pin 33 normally biases lever 25 against the rocket contact ring A and prevents forward movement of the rocket R in tube 2.

Figure 5:
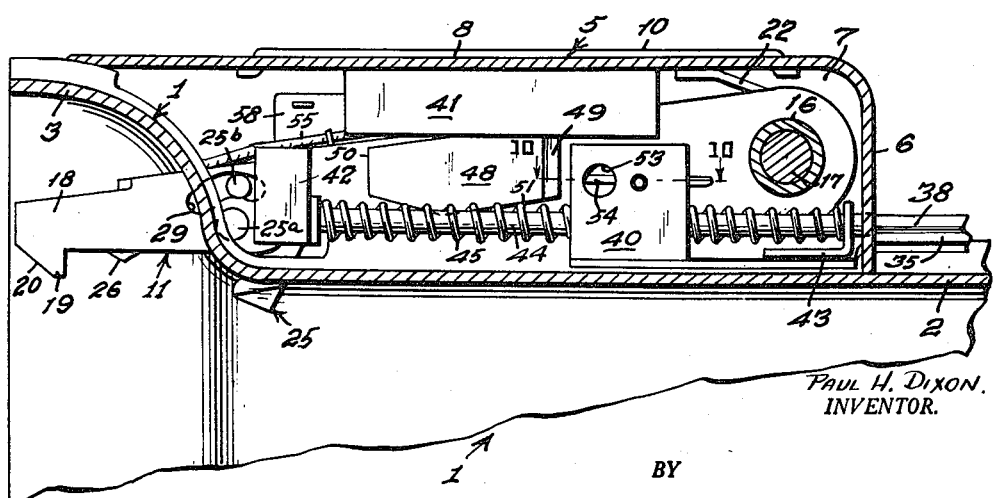
Fig. 5 is a sectional view taken along the line 5—5 of Fig. 3, and looking in the direction of the arrows.

Means for making electrical contact between the rocket contact ring A and the trigger circuit (not shown) is provided and consists of substantially U-shaped slide member indicated generally by 34. This slide is illustrated in perspective per se in Fig. 11 and comprises a pair of rearwardly extending arms 35 and 36. A portion of the frontal end is turned back upon itself to form a loop 37 to provide a handle for the loader in manipulating the mechanism. The inner edges of the arms are turned up as at 38 to provide a pair of runners which slide in a pair of slots 39 provided in the front wall 6 of housing 5. Slide 34 is arcuate in cross section and is adapted to slide along the outer peripheral surface of tube 2 and is guided into housing 5 by the slots 39. A block 40 is carried by the rearward portion of arm 35 and normally rides under a turned down portion 41 of top wall 8 (see Figs. 3 and 5) which serves to keep the slide close to the tube 1 for a purpose that will be readily apparent as the description progresses. A first bracket 42 is carried by a side wall 7 (see Fig. 3) and a second bracket 43, in alignment with the first bracket 42, is carried by arm 35 of slide 34. A guide rod 44 is supported at its ends in brackets 42 and 43 and a coil spring 45 encircles rod 44 and bearing against brackets 42 and 43 normally tends to bias the slide in a forward direction. Provision is made for the passage of rod 42 and spring 45 through block 40 by longitudinal bore 46 in the block. A U-shaped switch operating member 47 is provided on the rearward portion of arm 36 of slide 34 (see Fig. 11) the function of which is to be described later.

Means for lifting the latch lever 11 and its stop lever 25 out of the path of rocket blast is carried by the latch lever and the slide and cooperate to lock the slide in its cocked position when pushed in. A cam plate 48 is affixed to the outer side of side member 13 of the latch lever 11 and is disposed substantially medially thereof. Its upper edge is flush with the upper edge of side member 13. Cam 48 defines a beveled forward edge 49, a vertical rearward edge 50 and an inclined lower edge 51. A locking and time delay plunger 52 is slidably mounted in a transverse bore 53 in block 40. A spring 54 is provided to normally bias plunger 52 towards the cam 48.

Electrical contact for firing a rocket when in position in tube 2 is provided and consists of a lead 55 clamped to the contact button 26 by a screw 56. Screw 56 also serves to hold the contact button 26, bushing 27 and washer 28 in assembled relation in block 18. An insulating plate 57 serves to insulate the connection from metallic parts of the lever. A first lead 55 is connected to a switch 58 carried by the inner surface of one side wall 7. A button 59 (see Fig. 3) operates the switch and is carried by the under part of switch 58 and lies in the path of member 47 on arm 36 of slide 34. Switch 58 is connected by a second lead 60 to a trigger mechanism not shown. A third lead 61 provides a ground connection from the latch lever 11 to the latch housing 5.

As the firing circuit, not shown, is connected to the contact button, no wires are necessary to connect before arming the rocket in the tube 2. A live rocket R is inserted into the tube 2 until the forward edge of the rocket contact band support ring A abuts the rearward vertical face 31 of the rocket stop lever 25 which will prevent further forward movement of the rocket into the tube 2. The rear edge of the support ring A will be engaged by the vertical face 21 of the latch portion 19. Thus the rocket R will be prevented from sliding out from the rear of the tube 2. When the rocket R is inserted into the tube 2, the warhead, not shown, and the contact band support A will ride easily under the stop lever 25 and latch portion 19 as they will be pushed upwardly against the bias of torsion spring 22 and coil spring 32. The upward movement of lever 11 is made possible by the rearward beveled face 20 of latch 19 and the rotation of stop lever 25 against the pull of coil spring 32. This forward rotation of stop lever 25 is limited to the necessary movement to clear the latch and stop levers from the rocket blast by arcuate slots 29 and pin 26ª. Thus, a smooth and rapid loading of the tube is possible. When the rocket R is held between the latch portion 19 and the stop lever 25, contact button 26 will bear on the electrical contact band B of the rocket. Due to torsion spring 22, positive electrical contact is made as long as the rocket is in this position. Beveled surfaces 24 on latch 19 and 30 on stop lever 25 will prevent "hang" of the rocket during loading by a fin, as when a fin strikes are of these beveled surfaces, it will be rotated out of the way. The rocket is now ready for arming. Arming is accomplished by moving the loader's slide 34 rearwardly approximately one and nine sixteenths inches, or until the time delay plunger 52, which is carried in block 40 on arm 35 of slide 34 is moved to the rear of cam plate 48 and snaps over the vertical edge, whence the slide is held in "cocked" position. As the slide is moved rearwardly, the plunger 52 will be moved inwardly by the beveled edge 49 and will be held thus until reaching the end of the plate 48. At the same time, the member 47 will be moved under the button 59 of switch 41 which will close the switch to establish electrical contact between the trigger (not shown) and the rocket. As the circuit is grounded when the rocket is in the tube, it is now ready to be fired.

Actuating a trigger mechanism, not shown, ignites the rocket. The tension of coil spring 45 is such that when the rocket attains a thrust of approximately nineteen pounds, the stop lever 25 will be raised and at the same time the latch lever 11 will lift upwardly to bring the delay plunger 52 down under the angled lower edge 51 of cam plate 48 and release slide 34 to move forward. As the slide moves forward under the inclined edge 51 of cam 48, the plunger will raise the latch lever 11 upwards sufficiently to remove the stop lever 25 and the latch 19 out of the rocket blast path (see Fig. 7). When the slide 34 reaches its full forward position, the plunger will resume its position in front of the cam plate 48. Also, the circuit will be broken by the member 47 moving away from button 59 of switch 41 and the launcher will be in safe or uncocked condition.

From the foregoing description, it is apparent that a more efficient latch mechanism has been devised that will enable the operator to more quickly and safely load, unload and fire rockets from the launcher. In case of a misfire, all that is necessary to do to unload the rocket is to push or pull slide 34 forward to break the firing circuit. Then the safety switch on the trigger mechanism (not shown) may be moved to its "safe" position. The slide 34 is then pushed to its full rearward position into the housing 5 and then pulled out sufficiently for the plunger 52 to lift lever 11. The slide 34 is held here in this position and the rocket may be removed from the tube and disarmed.

While a preferred form of the invention has been shown and described, various modifications and substitutions of equivalents will occur to those skilled in the art after a study of the foregoing disclosure. Hence, the disclosure should be taken in an illustrative rather than a limiting sense, and it is the desire and intention to reserve all modifications with the scope of the subjoined claims.

What is claimed is:

1. In a latch mechanism for a rocket launcher, a rocket launching tube having an opening adjacent its breech end thereof, a housing secured to the breech end of said tube and over said opening, said housing including a pair of side walls, a front wall and a top wall, a spring-loaded latch lever pivotally mounted at its forward end to said side walls of said housing, the rearward end of said latch lever normally extending through said opening and into said launching tube, a spring loaded rocket stop lever carried by the rearward portion of said latch lever for holding a rocket in its firing position in said launching tube, an electrical contact button carried by the rearward end of said latch lever adapted to contact the contact band of a rocket when in firing position in said launching tube, a contact switch carried by one of said side walls of said housing, a spring-loaded slide member defining a pair of rearwardly extending arms adapted to slide along the outer peripheral surface of said launching tube and into said housing, a cam plate carried by one side of said latch lever, a spring-loaded plunger carried by one arm of said slide, a switch operating member carried by the other arm of said slide member, said slide member, said plunger, said cam plate and said switch operating member functioning, when said slide is pushed all the way into said housing, to lock said slide in its rearward position and to close said switch, and electrical connections between said contact button, said switch and a firing means comprising a first electrical lead connecting said contact button to said switch, a second electrical lead connecting said switch to a firing means and a third electrical lead grounding said switch to said housing.

2. A latch mechanism for a rocket launcher including a rocket launching tube having an opening therein adjacent its breech end and a housing securing to said breech end of said tube and over said opening, means for holding a rocket in firing position in said tube comprising, an elongated spring-loaded lever substantially channel-shaped in cross section, pivoted at its forward end in said housing, said lever being disposed in a parallel relation with respect to the longitudinal axis of said tube, its rearward end normally extending through said opening and into said tube, said rearward end defining a latch portion adapted to engage the rearward edge of a rocket band supporting ring of a rocket when said rocket is in the firing position within a tube and prevent rearward displacement thereof, a spring-loaded stop lever pivotally mounted on said elongated spring-loaded lever and spaced forwardly of said latch portion and in longitudinal alignment therewith, said stop lever adapted to engage the forward edge of the contact band supporting ring on the aforesaid rocket when it is in the aforesaid firing position in said tube to prevent forward displacement thereof, an electrical contact button carried by said elongated spring-loaded lever and disposed between said latch portion and said stop lever and in longitudinal alignment therewith, said button normally contacting a contact band of a rocket when said rocket is in its firing position in said tube, means raising said latch lever upon forward movement of said slide comprising, a cam plate, defining an inclined under edge, a vertical rearward edge and a beveled forward edge, secured to one side of said latch lever, a spring-loaded slide member adapted to slide on the outer peripheral surface of said tube and into said housing, a spring-biased plunger carried by said slide member and being disposed transversely with respect to the longitudinal axis of said tube, said plunger being normally biased against the side of said elongated lever and adjacent the beveled edge of said cam plate, said plunger, upon rearward travel of said slide to snap over said vertical edge of said cam plate and lock said slide in a full rearward position, said stop lever to be lifted by forward passage of said contact band supporting ring upon firing of said rocket in said tube and release said plunger to allow said slide to move in a forward direction, said plunger riding under said inclined edge of said cam plate and lift said elongated lever upwardly to remove said latch portion and said stop lever from said tube, a firing circuit connecting said contact button to an electrical firing source, a contact switch mounted in said housing and in said circuit, and means carried by said slide cooperating with said switch to close said switch upon locked position of said slide and opening said switch upon release of said slide to said forward position.

3. A latch mechanism for a rocket launcher as described in claim 2 wherein said cam plate and said spring-biased plunger coact upon forward movement of said slide to provide a time delay of sufficient duration for said lifting of said elongated lever whereby said latch portion and said stop lever is removed from said tube to allow escape of blast gases in said tube from a rocket fired therein.

4. In a latch mechanism for a rocket launcher as described in claim 2 wherein said slide comprises a U-shaped member defining an arcurate cross section and a pair of rearwardly extending arms, one of the arms carrying said spring biased plunger and the other arm said switch operating member.

References Cited in the file of this patent
UNITED STATES PATENTS

| | | |
|---|---|---|
| 2,460,929 | Goff | Feb. 8, 1949 |
| 2,751,818 | Bonnett | June 26, 1956 |
| 2,764,066 | Doak et al. | Sept. 25, 1956 |
| 2,830,496 | Anderson et al. | Apr. 15, 1958 |
| 2,836,105 | Doak et al. | May 27, 1958 |